US012283227B2

(12) United States Patent
Tian et al.

(10) Patent No.: US 12,283,227 B2
(45) Date of Patent: Apr. 22, 2025

(54) DISPLAY PANEL

(71) Applicant: WUHAN CHINA STAR OPTOELECTRONICS TECHNOLOGY CO., LTD., Hubei (CN)

(72) Inventors: Chao Tian, Hubei (CN); Mingyue Li, Hubei (CN); Yanqing Guan, Hubei (CN); Haiming Cao, Hubei (CN); Fei Ai, Hubei (CN); Guanghui Liu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/247,256

(22) PCT Filed: Feb. 8, 2023

(86) PCT No.: PCT/CN2023/074954
§ 371 (c)(1),
(2) Date: Mar. 29, 2023

(87) PCT Pub. No.: WO2024/119608
PCT Pub. Date: Jun. 13, 2024

(65) Prior Publication Data
US 2025/0078728 A1 Mar. 6, 2025

(30) Foreign Application Priority Data
Dec. 7, 2022 (CN) ........................ 202211565397.X

(51) Int. Cl.
*G09G 3/32* (2016.01)

(52) U.S. Cl.
CPC ....... *G09G 3/32* (2013.01); *G09G 2300/0408* (2013.01); *G09G 2310/0267* (2013.01); *G09G 2310/08* (2013.01); *G09G 2320/0233* (2013.01)

(58) Field of Classification Search
CPC ............. G09G 3/32; G09G 2300/0408; G09G 2310/0267; G09G 2310/08; G09G 2320/0233
See application file for complete search history.

(56) References Cited

U.S. PATENT DOCUMENTS 10,977,979 B1 * 4/2021 Xiao ........................ G09G 3/20
2007/0274433 A1 * 11/2007 Tobita .................. G11C 19/184 377/64
(Continued)

FOREIGN PATENT DOCUMENTS

CN 101079243 A 11/2007
CN 102982777 A 3/2013
(Continued)

OTHER PUBLICATIONS

International Search Report in International application No. PCT/CN2023/074954, mailed on Sep. 7, 2023.
(Continued)

*Primary Examiner* — Andrew Sasinowski
(74) *Attorney, Agent, or Firm* — PV IP PC; Wei Te Chung

(57) ABSTRACT

An embodiment of the present disclosure is directed to a display panel. The display panel includes a plurality of scan lines and a plurality of forward and reverse scan pull-down circuit. The plurality of scan lines is located on the display area. Each of the forward and reverse scan pull-down circuits includes a forward scan control module, a reverse scan control module, and a pull-down module located on a display area. The pull-down module includes an output
(Continued)

terminal and a control terminal coupled to an output terminal of the forward scan control module and an output terminal of the reverse scan control module.

18 Claims, 6 Drawing Sheets

(56) References Cited

U.S. PATENT DOCUMENTS

| | | | | |
|---|---|---|---|---|
| 2014/0159999 A1* | 6/2014 | Gu | ........................ | G09G 3/3677<br>345/100 |
| 2021/0264868 A1* | 8/2021 | Zhao | ..................... | G09G 3/3677 |

FOREIGN PATENT DOCUMENTS

| | | | |
|---|---|---|---|
| CN | 108010498 | A | 5/2018 |
| CN | 109493816 | A | 3/2019 |
| CN | 111681625 | A | 9/2020 |
| CN | 115294911 | A | 11/2022 |
| CN | 115410510 | A | 11/2022 |
| CN | 115527477 | A | 12/2022 |
| KR | 20190018804 | A | 2/2019 |

OTHER PUBLICATIONS

Written Opinion of the International Search Authority in International application No. PCT/CN2023/074954, mailed on Sep. 7, 2023.
Chinese Office Action issued in corresponding Chinese Patent Application No. 202211565397.X dated Jan. 23, 2025, pp. 1-7.

* cited by examiner

DISPLAY PANEL

FIELD OF INVENTION

The present disclosure relates to a field of display technology, in particular to a display panel.

BACKGROUND

A gate driving circuit (Gate Driver On Array, GOA) in the display is set on a non-display area NA, and scan lines are set in a display area AA. After a row of sub-pixels is charged, the scanning signal Gate applied on the scan line corresponding to the row of sub-pixels needs to be pulled down to a low voltage level. But for the ultra-wide display screen, the scan line in the display area AA is longer, and the low voltage level signal is transmitted from both ends of the scan line to the scan line, which causes the pull-down delay of the scanning signal Gate in the scan line (from high level to low level) time delay) is large. However, the scanning signal Gate in scan line cannot be pulled down to a low level in time, and there will be a risk of wrong charging, which will lead to uneven display.

SUMMARY

Technical Problem

The present disclosure provides a display panel that can reduce the pull-down delay of the scanning signal, reduce the risk of mischarging, and improve display uniformity.

Technical Solution

According to an embodiment of the present disclosure a display panel includes a display area. The display panel includes a plurality of scan lines and a plurality of forward and reverse scan pull-down circuit. The plurality of scan lines is located on the display area. Each of the forward and reverse scan pull-down circuits includes a forward scan control module, a reverse scan control module, and a pull-down module located on the display area. The pull-down module includes an output terminal and a control terminal coupled to an output terminal of the forward scan control module and an output terminal of the reverse scan control module. The plurality of scan lines comprise a first scan line corresponding to the forward and reverse scan pull-down circuit, and the output terminal of the pull-down module is coupled to the first scan line.

Optionally, the forward scan control module is located on the display area.

Optionally, the reverse scan control module is located on the display area.

Optionally, the pull-down module comprises a first switching transistor that comprises a control terminal, connected to the output terminal of the forward scan control module and the output terminal of the reverse scan control module; an input terminal, fed with a low voltage level signal; and an output terminal, connected to the first scan line.

Optionally, the plurality of scan lines comprise a second scan line coupled to the forward and reverse scan pull-down circuit, and the forward scan control module includes a second switching transistor. A control terminal of the second switching transistor is connected to the second scan line, an output terminal of the second switching transistor is connected to the control terminal of the first switching transistor, and an input terminal of the second switching transistor is connected to the forward control signal.

Optionally, the plurality of scan lines comprise a third scan line corresponding to the forward and reverse scan pull-down circuit, and the reverse scan control module includes a third switching transistor. A control terminal of the third switching transistor is connected to the third scan line, an output terminal of the third switching transistor is connected to the control terminal of the first switching transistor, and an input terminal of the third switching transistor is fed with a reverse control signal.

Optionally, the third scan line, the first scan line and the second scan line corresponding to the forward and reverse scan pull-down circuits are arranged adjacently.

Optionally, the display panel further comprises a low voltage level signal line, located on the display area and connected to an input terminal of the pull-down module.

Optionally, the display panel further comprises a plurality of pixel circuits, arranged in one-to-one correspondence with the plurality of forward and reverse scan pull-down circuits. The output terminal of the pull-down module of the forward and reverse scan pull-down circuit is connected to a scan signal input terminal of the pixel circuit.

Optionally, the display panel further comprises a non-display area located outside the display area, and a gate driving circuit. The gate driving circuit includes a plurality of cascaded gate driving units and located on the non-display area. The plurality of gate driving units are arranged in one-to-one correspondence with the plurality of forward and reverse scan pull-down circuits. A control terminal of a forward scan control module of the forward and reverse scan pull-down circuit is connected to a scan signal output terminal of a next stage gate driving unit that is a gate driving unit at next stage of the gate driving unit corresponding to the forward and reverse scan pull-down circuit. A control terminal of the reverse scan control module of the forward and reverse scan pull-down circuit is connected to a scan signal output terminal of a previous one stage gate driving unit that is a gate driving unit at previous one stage of the gate driving unit corresponding to the forward and reverse scan pull-down circuit.

Optionally, the output terminal of the pull-down module connects the first scan line at a middle of the first scan line.

Optionally, the reverse scan control module is located on the display area.

Optionally, the first switching transistor is a transistor.

Optionally, a control end of the first switching transistor is a gate of the transistor, an input end of the first switching transistor is a drain of the transistor, and an output end of the first switching transistor is a source of the transistor.

Optionally, the second switching transistor is a transistor.

Optionally, a control end of the second switching transistor is a gate of the transistor, an input end of the second switching transistor is a drain of the transistor, and an output end of the second switching transistor is a source of the transistor.

Optionally, the third switching transistor is a transistor.

Optionally, a control end of the third switching transistor is a gate of the transistor, an input end of the third switching transistor is a drain of the transistor, and an output end of the third switching transistor is a source of the transistor.

Advantageous Effect

The present disclosure sets the forward and reverse scan pull-down circuit. Because the pull-down module of the forward and reverse scan pull-down circuit is located on the display area, the pull-down module and scan line are connected in the display area. After a row of sub-pixels is charged, a reduction of a pull-down delay (the time period from high voltage level to low voltage level) of the scanning signal transmitted by the scan line can pull down the scanning signal in scan line corresponding to the row of sub-pixels to low voltage level in time, thereby reducing the risk of wrong charge, and improving display uniformity. The present disclosure provides a simple structure to pull down voltage during forward and reverse scanning.

BRIEF DESCRIPTION OF DRAWINGS

The technical solutions and other beneficial effects of the present application will be apparent from the detailed description of the specific embodiments of the present application with reference to the accompanying drawings.

DETAILED DESCRIPTION OF EMBODIMENTS

The specific structural and functional details disclosed herein are representative only and are for the purpose of describing exemplary embodiments of the present application. However, the present application may be embodied in many alternative forms and should not be construed as being limited only to the embodiments set forth herein.

It is understood that terminologies, such as "center," "longitudinal," "horizontal," "length," "width," "thickness," "upper," "lower," "before," "after," "left," "right," "vertical," "horizontal," "top," "bottom," "inner," "outer," "clockwise," and "counterclockwise," are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

It should be understood that, when an element or layer is referred to herein as being "disposed on", "connected to" or "coupled to" another element or layer, it can be directly disposed on, connected or coupled to the other element or layer, or alternatively, that intervening elements or layers may be present. In contrast, when an element is referred to as being "directly disposed on," "directly connected to" or "directly coupled to" another element or layer, there are no intervening elements or layers present. In the figures, like numbers refer to like elements throughout.

It will be further understood that the term "and/or" includes any and all combinations of one or more of the associated listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present application are illustrated in detail in the accompanying drawings.

Figure 1:
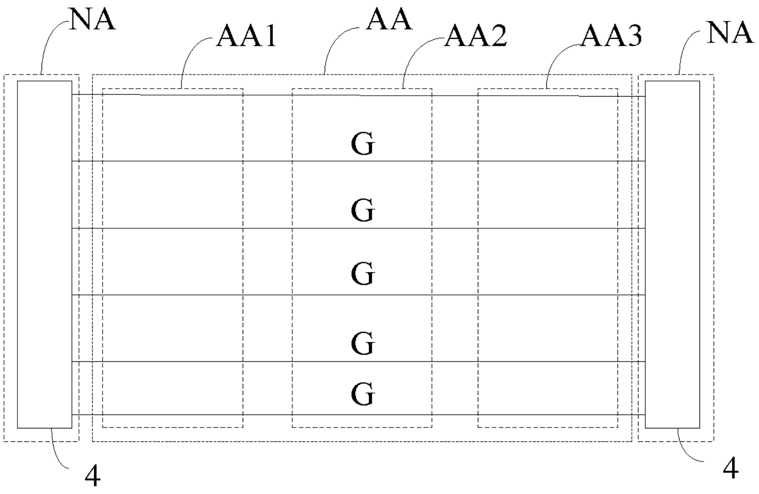
FIG. 1 illustrates a schematic diagram of a display panel according to an embodiment of the present disclosure.

Referring to FIG. 1 illustrating a schematic diagram of the display panel according to an embodiment of the present disclosure. The display panel includes a display area AA and non-display areas NA located on both sides of the display area AA. That is, two non-display areas NA can be arranged respectively on both sides of the display area AA.

Figure 2:
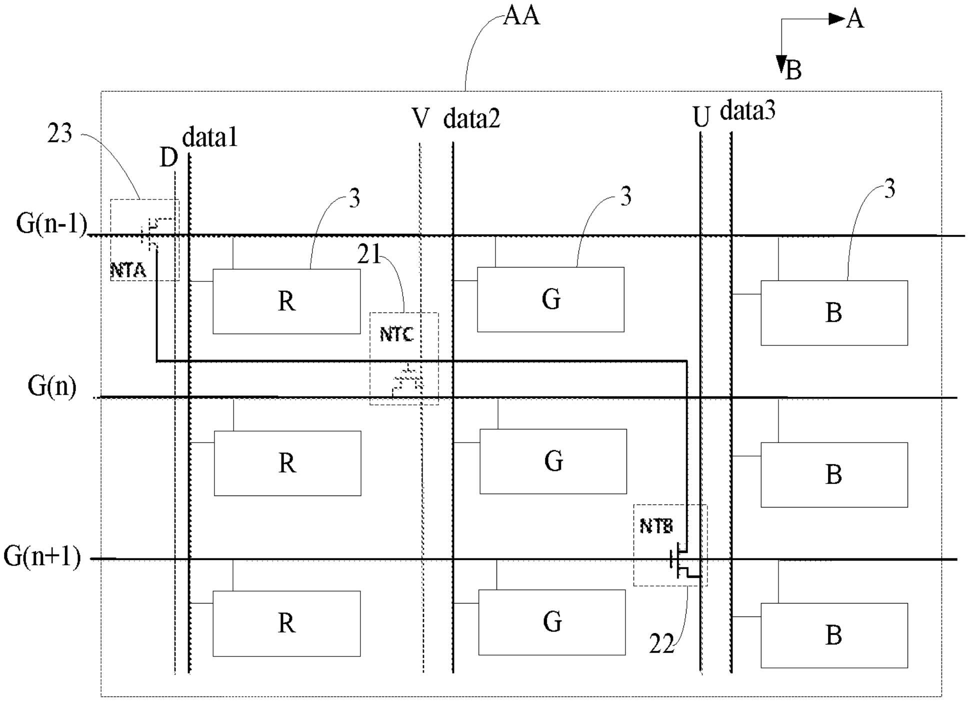
FIG. 2 illustrates a schematic diagram of a display panel according to one embodiment of the present disclosure.
Figure 3:
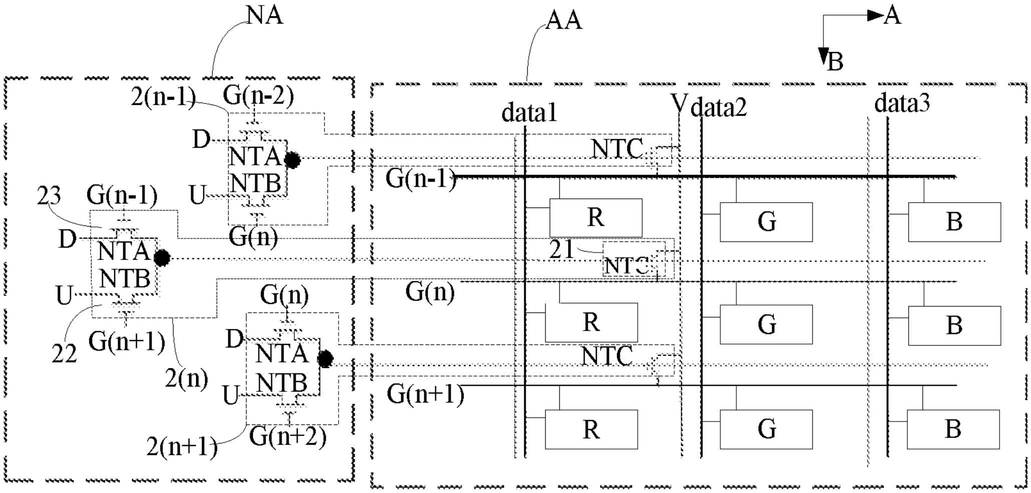
FIG. 3 illustrates a schematic diagram of a display panel according to one embodiment of the present disclosure.

As shown in FIG. 2 and FIG. 3, the display panel includes a plurality of scan lines G which are located in the display area AA, and are arranged in parallel and at intervals. The display area AA and non-display area NA are arranged along a first direction A, and each scan line G extends along the first direction A to the non-display area NA. The display area AA of the display panel is also provided with a plurality of sub-pixels 3 arranged in a matrix. The number of rows of sub-pixels 3 is the same as the number of scan lines G, and the multiple scan lines G are connected to multiple rows of sub-pixels 3 in one-to-one correspondence. When scanning each row of sub-pixels 3, a scan signal is input to the row of sub-pixels 3 through the scan line G. As shown in FIG. 2 and FIG. 3, there is a gap on both sides of each row of sub-pixels 3, and each scan line G can be arranged at the gap on one side of its corresponding row of sub-pixels 3.

The display panel also includes at least one forward and reverse scan pull-down circuit 2. The number of forward and reverse scan pull-down circuits 2 can be equal to or less than the number of scan lines G. The multiple scan lines G include a first scan line corresponding to the forward and reverse scan pull-down circuit 2. For example, the number of forward and reverse scan pull-down circuits 2 is N, and $N \geq 1$. The multiple scan lines G include N first scan lines corresponding to the N forward and reverse scan pull-down circuits 2 one-to-one. When the number of forward and reverse scan pull-down circuits 2 is the same as the number of scan lines G (that is, the number of scan lines G is N), N scan lines G serve as the first scan line of N forward and reverse scan pull-down circuits 2. As shown in FIG. 3, the nth scan line G(n) is the first scan line of the nth forward and reverse scan pull-down circuit 2(*n*), the (n−1)th scan line G(n−1) is the first scan line of the (n−1)th forward and reverse scan pull-down circuit 2(*n*−1), the (n+1)th scan line G(n+1) is the first scan line 2(*n*+1) of the (n+1)th forward and reverse pull-down circuit 2(*n*+1), where $1<n<N$.

Each forward and reverse scan pull-down circuit 2 includes a pull-down module 21, a forward scan control module 22 and a reverse scan control module 23. The pull-down module 21 is located on the display area AA. A control terminal of the pull-down module 21 is connected with an output terminal of the forward scan control module 22 and an output terminal of the reverse scan control module 23. An output terminal of the pull-down module 21 is connected with the corresponding first scan line.

The forward and reverse scanning pull-down circuit 2 can be implement forward and reverse scanning pull-down. The forward scanning control module 22 is used to conduct the pull-down module 21 during the forward scan, the reverse scan control module 23 is used to conduct the pull-down module 21 during the reverse scan, and the pull-down module 21 is used to pull down the scan signal to the low voltage level.

Specifically, during forward-scanning multiple rows of sub-pixels 3, the forward scan control modules 22 of the N forward and reverse scan pull-down circuits 2 are sequentially turned on. After the sub-pixels 3 in the n-th row is scanned, the pull-down module 21 in the n-th forward and reverse scan pull-down circuit 2(*n*) pulls down signal applied on the first scan line connected to the sub-pixel 3 in the n-th row from the high voltage level to low voltage level, and then the sub-pixel 3 in the (n+1)th row starts to scan. During reverse-scanning the multiple rows of sub-pixels 3, the reverse scan control modules 23 of the N forward and reverse scan pull-down circuits 2 are sequentially turned on. After the sub-pixels 3 in the n-th row is scanned, the pull-down module 21 in the n-th forward and reverse scan pull-down circuit 2(*n*) pulls down applied on the first scan line connected to the sub-pixel 3 in the n-th row from high voltage level to low voltage level, and then the sub-pixel 3 in the (n−1)th row starts to scan.

Since the pull-down module 21 and its corresponding first scan line are both located on the display area AA, a connection point of the output terminal of the pull-down module 21 on its corresponding first scan line is located on the display area AA, so as to shorten the connection route between the pull-down module 21 and its corresponding first scan line. In some embodiments, the connection point between the output terminal of the pull-down module 21 and the corresponding first scan line is located on the middle of the corresponding first scan line, so as to further shorten the connection route between the pull-down module 21 and its corresponding first scan line, thereby shortening a transmission period of the low level voltage signal output by the pull down module 21 and applied on its corresponding first scan line, and reducing the pull down delay of the scanning signal (that is, the time delay of the scanning signal from the high voltage level to low voltage level). It reduces the risk of wrong charging, and improves display uniformity.

The forward scan control module 22 can be located on the display area AA or the non-display area NA, and the reverse scan control module 23 can be located on the display area AA or non-display area NA. As shown in FIG. 2, the pull down module 21, forward scan control module 22 and reverse scan control module 23 are all located on the display area AA. As shown in FIG. 3, the pull-down module 21 is located on the display area AA. The forward scan control module 22 and reverse scan control module 23 are located on the non-display area NA.

The forward scan control module 22 and/or reverse scan control module 23 are located on the display area AA, shortening the connection route between forward scan control module 22 and/or reverse scan control module 23 and pull-down module 21, and further reducing signal transmission delay, thereby reducing pull-down delay of the scanning signals.

The multiple scan lines G also include a second scan line corresponding to the forward and reverse scan pull-down circuit 2. The multiple scan lines G also includes N second scan lines corresponding to the N forward and reverse scan pull-down circuits 2 one by one. it is to be noted that, any two of the first scan lines corresponding to different forward and reverse scan pull-down circuits 2, and any two of the second scan lines corresponding to different forward and reverse scan pull-down circuits 2. The second scan line corresponding to one forward and reverse scan pull-down circuit 2 can be a first scan line corresponding to another forward and reverse scan pull-down circuit 2. As shown in FIG. 3, the (n+1)th scan line G(n+1) is the first scan line corresponding to the (n+1)th forward and reverse scan pull-down circuit 2(*n*+1), and it is also the second scan line of the nth forward and reverse scan pull-down circuit 2(*n*).

The control terminal of the forward scan control module 22 in each forward and reverse scan pull-down circuit 2 is connected to the corresponding second scan line, so that the forward scan control module 22 is turned on or off according to the scanning signal applied on the corresponding second scan line. When the scanning signal applied on the corresponding second scan line is at high voltage level, the forward scanning control module 22 is turned on, and when the corresponding scanning signal applied on the second scan line is at low voltage level, the forward scan control module 22 is turned off. When the forward scan control module 22 is located on the display area AA, the connection route of the forward scan control module 22 to its corresponding second scan line can be shortened to reduce the signal delay.

The multiple scan lines G also include a third scan line corresponding to the forward and reverse scan pull-down circuit 2. That is to say, the multiple scan lines G also include N third scan lines corresponding to the N forward and reverse scan pull-down circuits 2 one-to-one. It is noted that, any two of the third scan lines corresponding to different forward and reverse scan pull-down circuits 2. The third scan line corresponding to one forward and reverse scan pull-down circuit 2 can be a first scan line corresponding to another forward and reverse scan pull-down circuit 2, or a second scan line corresponding to still another forward and reverse scan pull-down circuit 2. That is, a scan line can be used as a first scan line, a second scan line, and a third scan line of different forward and reverse scan pull-down circuits 2. As shown in FIG. 3, the nth scan line G(n) is used as the first scan line corresponding to the nth forward and reverse scan pull-down circuit 2(*n*). The nth scan line G(n) is also used as a second scan line corresponding to the (n−1)th forward and reverse scan pull-down circuit 2(*n*−1). The nth scan line G(n) is also used as the third scan line corresponding to the (n+1)th forward and reverse scan pull-down circuit 2(*n*+1).

The control terminal of the reverse scan control module 23 of each forward and reverse scan pull-down circuit 2 is connected to the corresponding third scan line. The reverse scan control module 23 is turned on or off according to the scan signal applied on the corresponding third scan line. When the corresponding scan signal applied on the third scan line is at high voltage level, the reverse scan control module 23 is turned on, and when the corresponding scan signal applied on the third scan line is at low voltage level, the reverse scan control module 23 is turned off. When the reverse scan control module 23 is located on the display area AA, the connection route of the reverse scan control module 23 to its corresponding third scan line can be shortened to reduce the signal transmission delay.

In some embodiments, the third scan line, the first scan line and the second scan line of each forward and reverse scan pull-down circuit 2 are adjacently arranged, further shortening the connection path between the forward and reverse scan pull-down circuit 2 and the corresponding third scan line, first scan line or the second scan line, and further reducing the signal transmission delay. As shown in FIG. 3, the third scan line (i.e., the (n−1)th scan line G(n−1)), the first scan line (i.e., the nth scan line G(n)), and the second scan line (i.e., the (n+1)th scan line G(n+1)) of the nth forward and reverse scan pull-down circuit 2(*n*) are arranged sequentially.

As shown in FIG. 2, the display panel may further include a forward control signal line U, a reverse control signal line D and a low voltage level signal line V. Each forward and reverse scan pull-down circuit 2 is also connected to the forward control signal line U, the reverse control signal line D and the low level signal line V. Specifically, an input terminal of the forward scan control module 22 of each forward and reverse scan pull-down circuit 2 is connected to the forward control signal line U, and an input terminal of the reverse scan control module 23 of each forward and reverse scan pull-down circuit 2 is connected to the reverse control signal line D is connected, and an input terminal of the pull-down module 21 of each forward and reverse scan pull-down circuit 2 is connected to the low voltage level signal line V.

The forward control signal line U transmits the forward control signal to the forward scan control module 22. The reverse control signal line D transmits the reverse control signal to the reverse scan control module 23. The low voltage level signal line V transmits a low voltage level signal to the pull-down module 21.

As shown in FIG. 2, the pull-down module 21, forward scan control module 22 and reverse scan control module 23 are all located on display area AA. The forward control signal line U, reverse control signal line D and low voltage level signal line V can all be located on the display area AA. The forward control signal line U, the reverse control signal line D and the low level signal line V can be arranged in parallel and at intervals. In addition, the forward control signal line U, the reverse control signal line D and the low level signal line V may be arranged on the same layer. The forward control signal line U and the plurality of scan lines G can be crossed and insulated, that is, the forward control signal line U and multiple scan lines G are set on different layers. The orthographic projection of the forward control signal line U on the layer where the multiple scan lines G are located intersects the multiple scan lines G. The reverse control signal line D and plurality of scan lines G can be crossed and insulated, that is, the reverse control signal line D and multiple scan lines G are set on different layers. The orthographic projection of the reverse control signal line D on the layer where the multiple scan lines G are located intersects multiple scan lines G. The low voltage level signal line V and multiple scan lines G can be crossed and insulated, that is, the low voltage level signal line V and multiple scan lines G are set on different layers. The orthographic projection of the low voltage level signal line V on the layer where the multiple scan lines G on the layer where the scan lines G are located intersects multiple scan lines G.

In some embodiments, the forward control signal line U, the reverse control signal line D and the low voltage level signal line V all extend along a second direction B perpendicular to the first direction A.

In the process of forward-scanning multiple rows of sub-pixels 3, after the sub-pixels 3 in the nth row are scanned, the (n+1)th scan line G(n+1) (i.e., the second scan line of the nth forward and reverse scan pull-down circuit 2(*n*)) transmits a scan signal at high voltage level, and the forward scan control module 22 of the nth forward and reverse scan pull-down circuit 2(*n*) is turned on. At this time, the reverse scan control module 23 is turned off. The forward control signal line U transmits a high voltage level forward control signal to the forward scan control module 22 of the nth forward and reverse scan pull-down circuit 2(*n*), so that the forward scan control module 22 transmits a high voltage level signal to the corresponding pull-down module 21, so as to control the pull-down module 21 to pull down the scan signal applied on first scan line (i.e., the nth scan signal line G(n)) to low voltage level.

In the process of reverse-scanning multiple rows of sub-pixels 3, after the n-th row of sub-pixels 3 are scanned, the (n−1)th scan line G(n−1) (i.e., the third scan line corresponding to the n-th forward and reverse scan pull-down circuit 2(*n*) transmit a scan signal at a high voltage level, the reverse scan control module 23 of the nth forward and reverse scan pull-down circuit 2(*n*) is turned on, and the forward scan control module 22 is turned off. The reverse control signal line D transmits a high voltage level reverse control signal to the reverse scan control module 23 of the nth forward and reverse scan pull-down circuit 2(*n*), so that the reverse scan control module 23 transmits a high voltage level signal to the corresponding pull-down module 21, to control the pull-down module 21 to pull down a scan signal applied on the first scan line (i.e., the scanning signal of the n-th scanning signal G(n)) to a low voltage level.

As shown in FIG. 2, the forward scan control module 22 is located on the display area AA. The forward scan control module 22 of the nth forward and reverse scan pull-down circuit 2(*n*) closes to the (n+1)th scan line G(n+1) and forward control signal line U. Specifically, the forward scan control module 22 of the nth forward and reverse scan pull-down circuit 2(*n*) can be set at the intersection of the (n+1)th scan line G(n+1) and the forward control signal line U, so as to shorten a connection path among the forward scan control module 22 of the nth forward and reverse scan pull-down circuits 2(*n*), the (n+1)th scan line G(n+1) and the forward control signal line U, thereby reducing the signal transmission delay. The reverse scan control module 23 is located on the display area AA. The reverse scan control module 23 of the nth forward and reverse scan pull-down circuit 2(*n*) can be close to the (n−1)th scan line G(n−1) and the reverse control signal line D. Specifically, the reverse scan control module 23 of the nth forward and reverse scan pull-down circuit 2(*n*) can be set at the intersection of the (n−1)th scan line G (n−1) and the reverse control signal line D, so as to shorten a connection path among the reverse scan control module 23 of the nth forward and reverse scan pull-down circuit 2(*n*), the (n−1)th scan line G(n−1) and the reverse control signal line D, thereby reducing the signal transmission delay. In addition, the pull-down module 21 of the n-th forward and reverse scan pull-down circuit 2(*n*) can be close to the nth scan line G(n) and the low voltage level signal line V. Specifically, the pull-down module 21 of the nth forward and reverse scan pull-down circuit 2(*n*) can be set at the intersection of the nth scan line G(n) and the low voltage level signal line V, so as to shorten a connection path among the pull-down module 21 of the nth forward and reverse scan pull-down circuit 2(*n*), the nth scan line G(n) and the low voltage level signal line V, thereby reducing the signal transmission delay.

The pull-down module 21 is connected to the forward scan control module 22 and the reverse scan control module 23. The pull-down module 21 is connected between its corresponding forward scan control module 22 and reverse scan control module 23, shortening a first connection line between the pull-down module 21 and its corresponding forward scan control module 22, and shortening a second connection line between the pull-down module 21 and its corresponding reverse scan control module 23, and thereby reducing the signal transmission delay. The first connection line and the second connection line can be set on the same layer. The first connection line (and the second connection line) can be set on different layers from the scan line G. The forward control signal line U, the reverse control signal line D and the low level signal line V can also be set in different layers. Since the pull-down module 21 is connected to the low voltage level signal line V, the forward scan control module 22 is connected to the forward control signal line U, and the reverse scan control module 23 is connected to the reverse control signal line D, the low voltage level signal line V is arranged between the forward control signal line U and the reverse control signal line D, that is, the reverse control signal line D, the low voltage level signal line V and the forward control signal line U are arranged sequentially along the first direction A.

The display panel may further include a plurality of data lines data located on the display area AA. The plurality of data lines data are arranged in parallel and at intervals. The number of data lines data is the same as the number of columns of sub-pixels 3, that is, multiple data lines data are connected to multiple columns of sub-pixels 3 in one-to-one correspondence. Each data line data extends along the second direction B. The data lines data and scan line G are arranged in different layers. The plurality of sub-pixels 3 are defined by insulating intersections of multiple data lines data and multiple scan lines G.

The pull-down module 21, forward scan control module 22 and reverse scan control module 23 are all located on the display area AA. The data line data can be set on the same layer as the forward control signal line U, reverse control signal line D and low level signal line V. The data line data can be arranged parallel to and spaced apart from the forward control signal line U, the reverse control signal line D and the low voltage level signal line. There is a gap on both sides of the data line data in each column, and the forward control signal line U, the reverse control signal line D and the low voltage level signal line V can be arranged at the gaps on both sides of the data line data. Since the gaps on both sides of the data line data are narrow, the forward control signal line U, the reverse control signal line D and the low voltage level signal line V can be arranged at the gaps on one side of the three data lines data. In some embodiments, the reverse control signal line D, the low voltage level signal line V, and the forward control signal line U are arranged close to the three adjacent data lines data, that is, the reverse control signal line D, the low voltage level signal line V and the forward control signal line U are respectively located on one side of the three adjacent data lines data, so as to shorten a length of the connecting lines between the pull-down module 21 and the forward scan control module 22, and shorten a length between the pull-down module 21 and the reverse scan control module 23, reducing the transmission delay. As shown in FIG. 2, the reverse control signal line D is on one side of the data line data1, the low voltage level signal line V is on one side of the data line data2, and the forward control signal line U is on one side of the data line data3.

Figure 4:
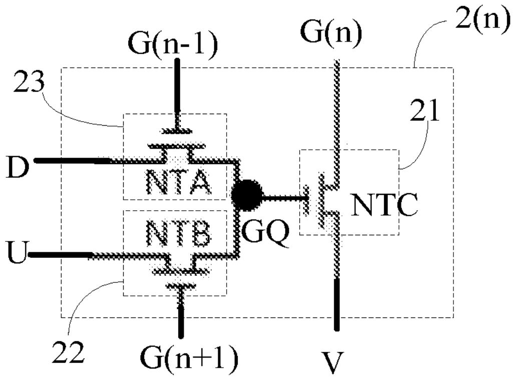
FIG. 4 illustrates a circuit diagram of a forward and reverse scan pull-down circuit in the display panel according to one embodiment of the present disclosure.

Specifically, as shown in FIG. 4, the pull-down module 21 of each forward and reverse scan pull-down circuit 2 includes a first switching transistor NTC. The control terminal (i.e. a gate) of the first switching transistor NTC, which is connected to the output terminal of the forward scan control module 22, the output terminal of the reverse scan control module 23, and the input terminal (e.g. a drain) of the first switching transistor NTC, is fed with a low voltage level signal. That is, the input terminal of the first switching transistor NTC is connected to the low voltage level signal line V, and the output terminal (e.g., the source) of the first switching transistor NTC is connected to the corresponding first scan line.

The forward scan control module 22 of each forward and reverse scan pull-down circuit 2 includes a second switching transistor NTB. The control terminal (i.e., a gate) of the second switching transistor NTB is connected to the second scan line. The output terminal (e.g., a drain) of the second switching transistor NTB is connected to the control terminal of the first switching transistor NTC. The input terminal of the second switching transistor NTB (e.g. a source) is fed with the forward control signal from the forward control signal line U.

The reverse scan control module 23 of each forward and reverse scan pull-down circuit 2 includes a third switching transistor NTA. The control terminal (i.e., a gate) of the third switching transistor NTA is connected to the corresponding third scan line. The output terminal (e.g. a drain) of the third switching transistor NTA is connected to the control terminal of the first switching transistor NTC. The input terminal of the third switching transistor NTA (e.g. the source) is fed with the reverse control signal from the reverse control signal line D.

Figure 5:
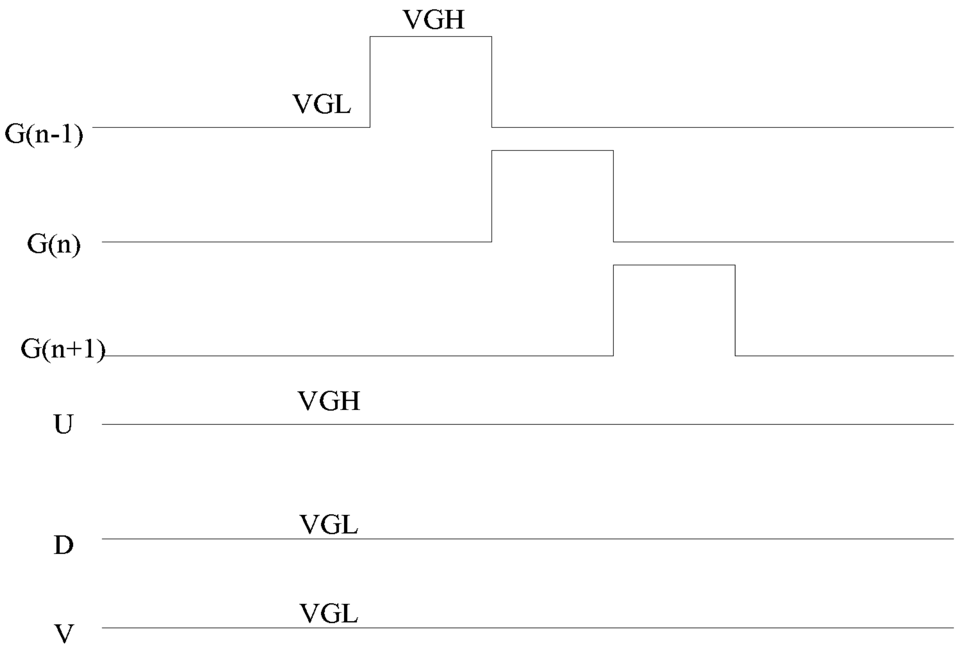
FIG. 5 illustrates a timing diagram of signals applied on the display panel during forward scanning.

As shown in FIG. 5, in the process of forward-scanning multiple rows of sub-pixels 3, the forward control signal line U provides a high voltage level signal VGH, and the reverse control signal line D provides a low voltage level signal VGL. A high voltage level scanning signal is sequentially input to the (n−1)th scan line G(n−1), nth scan line G(n), and (n+1)th scan line G(n+1), so that the sub-pixels 3 in the (n−1)th row, sub-pixels 3 in nth row, and sub-pixels 3 in the (n+1)th row are sequentially charged. Specifically, after the sub-pixel 3 in the nth row is charged, the second switching transistor NTB is turned on because the scanning signal input by the (n+1)th scan line G(n+1) is a high voltage level signal VGH. Since the forward control signal line U transmits the high voltage level signal VGH, voltage applied on the node GQ is pulled up to the high voltage level to turn on the first switching transistor NTC is turned on. The low level voltage signal line V transmits the low level voltage signal VGL to pull down the scanning signal transmitted by the nth scan line G(n) from high voltage level to low. voltage level.

Figure 6:
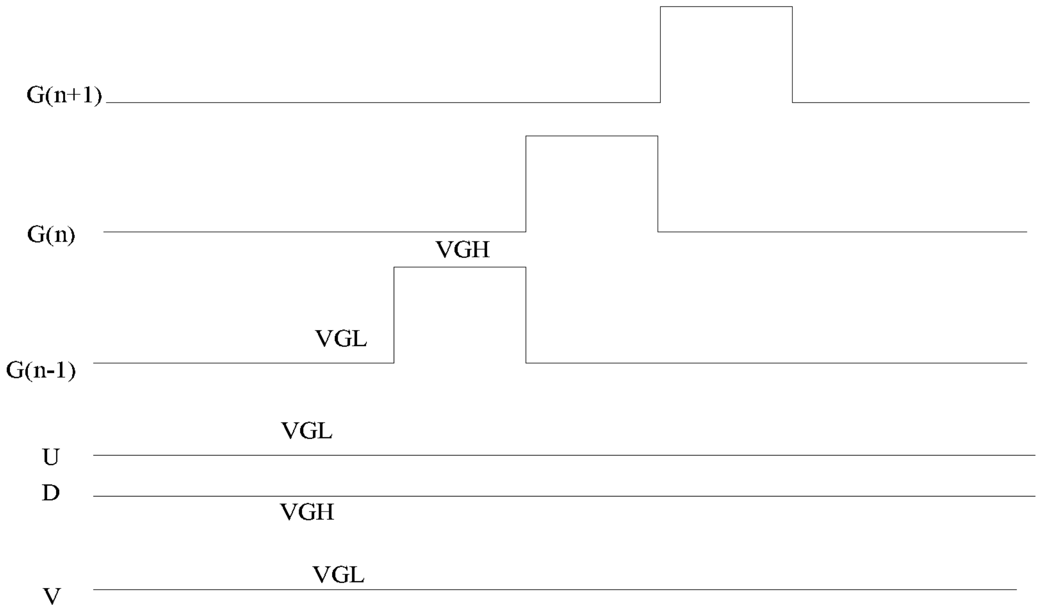
FIG. 6 illustrates a timing diagram of signals applied on the display panel during reverse scanning.

As shown in FIG. 6, in the process of reverse scanning multiple rows of sub-pixels 3, the forward control signal line U transmits a low voltage level signal VGL, and the reverse control signal line D transmits a high voltage level signal VGH. A high voltage level scan signal is sequentially to the (n+1)th scan line G(n+1), nth scan line G(n), and (n−1)th scan line G(n−1) to respectively charge sub-pixels 3 in the (n+1)th row, sub-pixels 3 in the nth row n, and sub-pixels in the (n−1)th row. Specifically, after the sub-pixel 3 in the nth row is charged, the third switching transistor NTA is turned on because the scanning signal input by the (n−1)th scan line G(n−1) is a high voltage level signal VGH. Since the reverse control signal line D transmits the high voltage level signal VGH, the node GQ is pulled up to the high voltage level to turn on the first switching transistor NTC. The low voltage level signal line V transmits the low voltage level signal VGL to pull down the scanning signal transmitted by the nth scan line G(n) from high voltage level to low voltage level.

The first switching transistor NTC, the second switching transistor NTB and the third switching transistor NTA are connected at the node GQ. The control terminal of the first switching transistor NTC is connected to the node GQ, the output terminal of the second switching transistor NTB is connected to the node GQ, and the output terminal of the third switching transistor NTA is connected to the node GQ. The control terminal of the first switching transistor NTC is connected with the output terminal of the second switching transistor NTB and the output terminal of the third switch NTA.

The first switching transistor NTC, the second switching transistor NTB and the third switch NTA can be Low Temperature Poly-silicon (LTPS) transistors, amorphous silicon (a_Si) transistors, indium gallium zinc oxide (IGZO) transistors, or Organic light emitting diodes (OLED).

Figure 7:
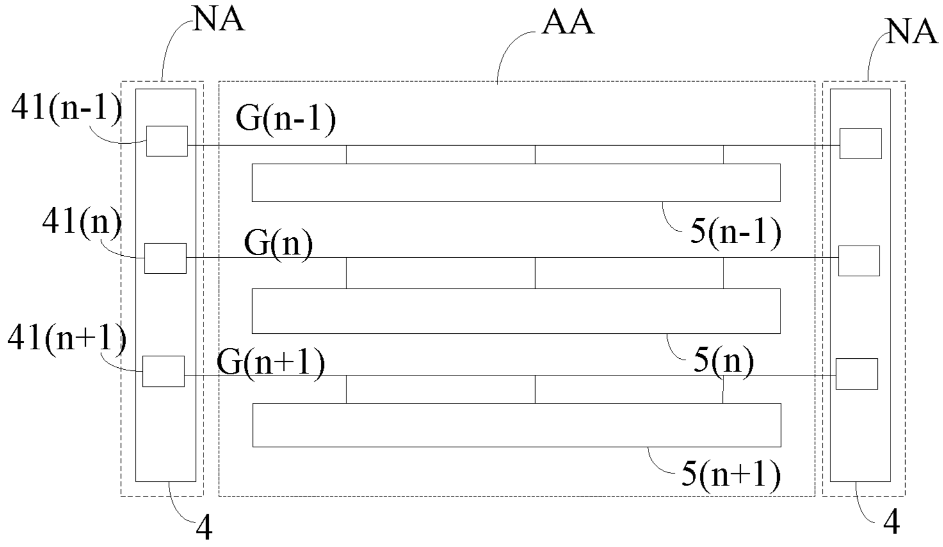
FIG. 7 illustrates a schematic diagram of a display panel according to another embodiment of the present disclosure.

As shown in FIG. 7, the display panel also includes multiple rows of pixel circuits 5 located on the display area AA. The number of rows of pixel circuits 5 may be the same as the number of scan lines G, and multiple rows of pixel circuits 5 are connected to multiple scan lines G in one-to-one correspondence. The number of rows of pixel circuits 5 may be equal to the number of forward and reverse scan pull-down circuits 2, or greater than the number of forward and reverse scan pull-down circuits 2. When the number of forward and reverse scan pull-down circuits 2 is N, the multi-row pixel circuits 5 include N rows of pixel circuits 5 corresponding to the N forward and reverse scan pull-down circuits 2 one-to-one. The output terminals of the pull-down modules 21 of the N forward and reverse scan pull-down circuits 2 are connected to the scanning signal input terminal of the N row of pixel circuits 5 in a one-to-one correspondence.

Figure 8:
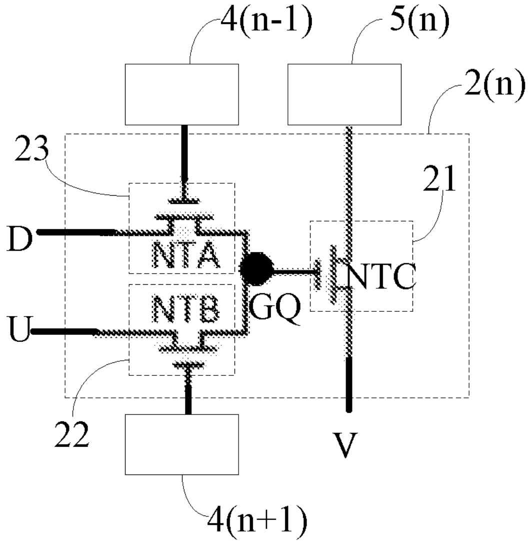
FIG. 8 illustrates a circuit diagram of a forward and reverse scan pull-down circuit in the display panel according to another embodiment of the present disclosure.

As shown in FIG. 8, the output terminal of the pull-down module 21 of the nth forward and reverse scan pull down circuit 2(*n*) is connected to the scan signal input terminal of the nth row of pixel circuits 5(*n*). Specifically, the output terminal (e.g., the source) of the first switching transistor NTC of the nth forward and reverse scan pull-down circuit 2(*n*) is connected to the scan signal input terminal of pixel circuits 5(*n*) in the nth row.

As shown in FIG. 7, the display panel includes a gate driving circuit 4 located on the non-display area NA. The gate driving circuit 4 includes a plurality of cascaded gate driving units 41. The number of gate driving units 41 may be the same as the number of scan lines G. The plurality of cascaded gate driving units 41 are connected to multiple scan lines G in one-to-one correspondence, and the plurality of cascaded gate driving units 41 are connected to multiple rows of sub-pixels 3 in one-to-one correspondence. When scanning each row of sub-pixels 3, a scan signal is input to the row of sub-pixels 3 through the gate driving unit 41 corresponding to the row of sub-pixels 3 and the corresponding scan line G of the row of sub-pixels 3. The gate driving circuit 4 can be driven by one side or two sides, which is not specifically limited here.

The number of the plurality of gate driving units 41 can be equal to or greater than the number of the forward and reverse scan pull-down circuits 2. When the number of forward and reverse scan pull-down circuits 2 is N, the plurality of gate driving units 41 include N gate driving units 41 corresponding to the N forward and reverse scan pull-down circuits 2 one-to-one. Specifically, the control terminal of the forward scan control module 22 of the forward and reverse scan pull-down circuit 2 is connected to the scan signal output terminal of a next stage gate driving unit 41(*n*+1). The control terminal of the reverse scan control module 23 of the forward and reverse scan pull-down circuit 2 is connected to the scan signal output terminal of the previous one stage gate driving unit 41(*n*−1).

As shown in FIG. 8, the control terminal of the forward scan control module 22 of the nth forward and reverse scan pull-down circuit 2(*n*) is connected to the scan signal output terminal of the (n+1)th stage gate driving unit 41(*n*+1). The control terminal of the nth reverse scan control module 23 of the forward and reverse scan pull-down circuit 2(*n*) is connected to the scan signal output terminal of the (n−1)th stage gate driving unit 41(*n*−1). Specifically, the control terminal (i.e. a gate) of the second switching transistor NTB of the nth forward and reverse scan pull-down circuit 2(*n*) is connected to the scan signal output terminal of the (n+1)th stage gate driving unit 41(*n*+1). The control terminal (i.e. a gate) of the third switching transistor NTA of the forward and reverse scan pull-down circuit 2(*n*) is connected to the scan signal output terminal of the (n−1)th stage gate driving unit 41(*n*−1).

Figure 9A:
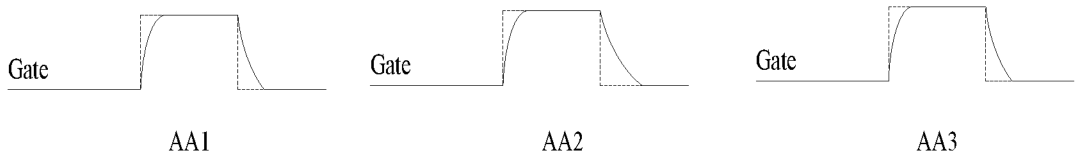
FIG. 9*a* illustrates a timing diagram of scanning signals applied on a conventional display panel.
Figure 9B:
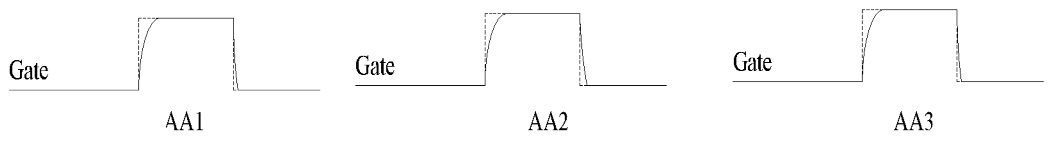
FIG. 9*b* is the timing diagram of scanning signal applied on the display panel according to one embodiment of the present disclosure.

After a row of sub-pixels 3 is scanned, the scanning signal Gate transmitted by the scan line G corresponding to the row of sub-pixels 3 is pulled down to low voltage level by the gate driving circuit 4 located on non-display area NA. The longer the scan line G is, the more time delay of transmitting the low voltage level signal through the scan line G is. It results in a relatively large pull-down delay of the scanning signal Gate. Referring to FIG. 1 and FIG. 9*a*, the pull-down delay of the scan signal Gate at the edge areas AA1 and AA3 is relatively large, while the pull-down delay of the scan signal Gate at the middle area AA2 is longer than that of the scan signal Gate at the edge areas AA1 and AA3. The embodiment of the present disclosure utilizes a forward and reverse scan pull-down circuit 2 in the display panel. After a row of sub-pixels 3 is scanned, the scan signal Gate transmitted by the scan line G corresponding to the row of sub-pixels 3 is pulled down to low voltage level by the pull-down module 21 of the forward and reverse scan pull-down circuit 2. Since the pull-down module 21 is located on the display area AA, the transmission delay of the low voltage level signal output by the pull-down module 21 transmitted by the scan line G is shortened, and the pull-down delay of the scan signal Gate in the scan line G is reduced. As shown FIG. 1 in conjunction with FIG. 9*b*, the pull-down delay of the scan signal Gate in the middle area AA2, edge areas AA1 and AA3 is all reduced.

Figure 10A:
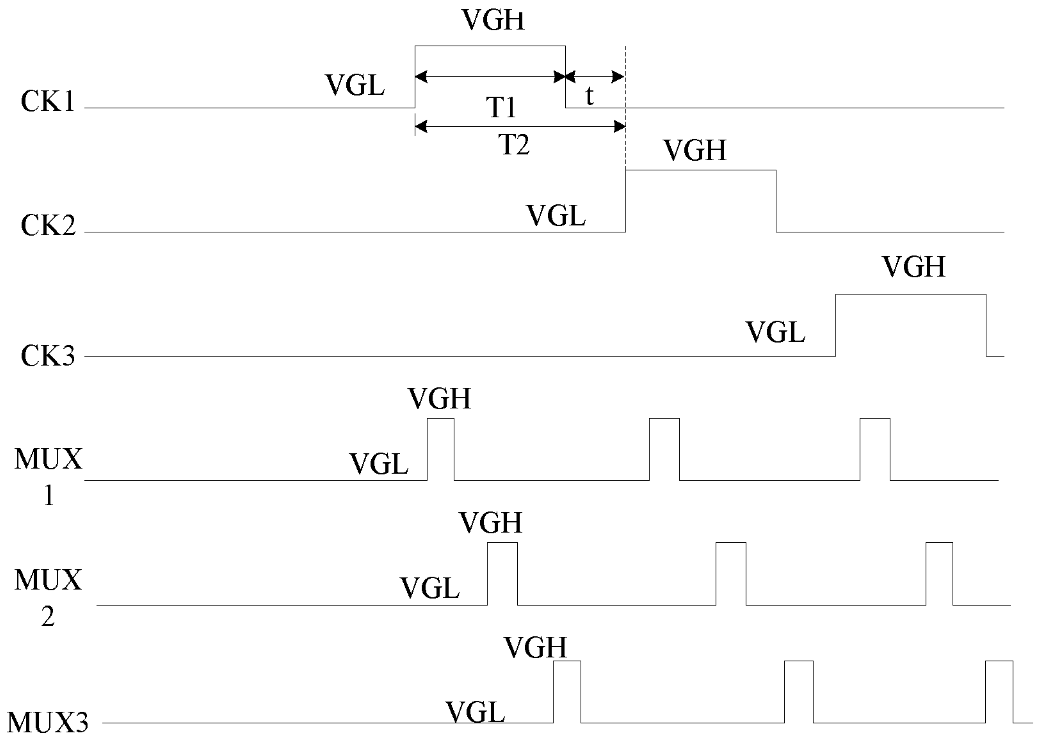
FIG. 10*a* is the charging timing diagram in prior art.

If the pull-down delay of the scanning signal Gate is relatively large, in order to prevent false charging, a time interval needs to be reserved between the high voltage level timing signals input by two adjacent rows of sub-pixels 3. As shown in FIG. 10*a*, the charging time required for a row of sub-pixels 3 is T2 (e.g., 14 us). A time interval t between two adjacent clock signals (between the falling edge of clock signal CK1 and the rising edge of clock signal CK2, and between the falling edge of clock signal CK2 and the rising edge of clock signal CK3) is t (e.g., 2 us). Therefore, the duration T1 of the clock signals CK1, CK2, CK3 at high voltage level input to a row of sub-pixels 3 is shortened (e.g., 12 us). That is, T2=T1+t. Because the duration of the clock signals at high voltage decreases, the actual charging duration of a row of sub-pixels 3 reduces. That is, the actual charging duration of a row of sub-pixels 3 is less than the required charging duration. In addition, during the period of inputting the clock signals at high voltage level to a row of sub-pixels 3, high voltage level multiplexing signals (such as high voltage level of MUX1, high voltage level of MUX2, high voltage level of MUX3) are sequentially inputted to charge this row of subpixels 3. Because the duration of the clock signals at high voltage level decreases, the duration allocated to each high voltage level multiplexing signal is reduced, resulting in a reduction in the charging duration of the sub-pixels.

Figure 10B:
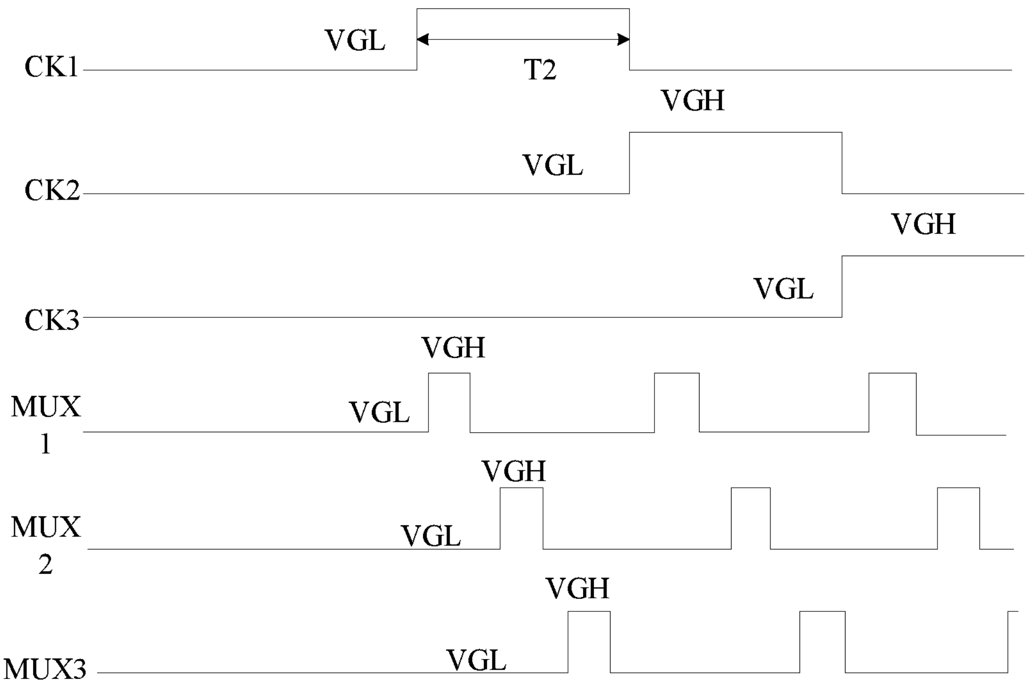
FIG. 10*b* is the charging timing diagram of the display panel according to the present disclosure.

If the pull-down time delay of the scanning signal Gate is effectively reduced, the reserved time interval between the high voltage level timing signals input by two adjacent rows of sub-pixels 3 is reduced, or even no reserved time interval is required. As shown in FIG. 10*b*, there is no time interval between two adjacent clock signals (between the falling edge of clock signal CK1 and the rising edge of clock signal CK2, and between the falling edge of clock signal CK2 and the rising edge of clock signal CK3), the duration of high voltage level of the clock signals CK1, CK2, CK3 inputted to a row of sub-pixels 3 is T2, that is, the actual charging time of a row of sub-pixels 3 is T2. Therefore, the actual charging time of a row of sub-pixels 3 effectively increases. The increase of the duration of the clock signal at high voltage level causes an increase of the duration of high voltage level of each multiplexing signal (such as the high voltage level of MUX1, the high voltage level of MUX2, and the high voltage level of MUX3), effectively improving the time period of charging the sub-pixels, and realizing high-frequency display.

To sum up, the present disclosure sets the forward and reverse scan pull-down circuit. Because the pull-down module of the forward and reverse scan pull-down circuit is located on the display area, the pull-down module and scan line are connected in the display area. After a row of sub-pixels is charged, a reduction of a pull-down delay (the time period from high voltage level to low voltage level) of the scanning signal transmitted by the scan line can pull down the scanning signal in scan line corresponding to the row of sub-pixels to low voltage level in time, thereby reducing the risk of wrong charge, and improving display uniformity. The present disclosure provides a simple structure to pull down voltage during forward and reverse scanning.

While the embodiments of the present disclosure have been shown and described above, it is to be understood that the above embodiments are exemplary and are not to be construed as limiting the present disclosure. One of ordinary skill in the art may make variations, modifications, substitutions and alterations to the above embodiments within the scope of the present disclosure.

What is claimed is:

1. A display panel, comprising a display area, and the display panel comprising:

a plurality of scan lines, located on the display area;

a plurality of forward and reverse scan pull-down circuit, each of the forward and reverse scan pull-down circuits comprising:

a forward scan control module;

a reverse scan control module; and a pull-down module, located on the display area, comprising:

a control terminal coupled to an output terminal of the forward scan control module and an output terminal of the reverse scan control module; and an output terminal;

wherein the plurality of scan lines comprise a first scan line corresponding to the forward and reverse scan pull-down circuit, and the output terminal of the pull-down module is coupled to the first scan line.

2. The display panel according to claim 1, wherein the forward scan control module is located on the display area.

3. The display panel according to claim 2, wherein the reverse scan control module is located on the display area.

4. The display panel according to claim 1, wherein the reverse scan control module is located on the display area.

5. The display panel according to claim 1, wherein the pull-down module comprises a first switching transistor that comprises:

a control terminal, connected to the output terminal of the forward scan control module and the output terminal of the reverse scan control module;

an input terminal, fed with a low voltage level signal; and an output terminal, connected to the first scan line.

6. The display panel according to claim 5, wherein the first switching transistor is a transistor.

7. The display panel according to claim 6, wherein a control end of the first switching transistor is a gate of the transistor, an input end of the first switching transistor is a drain of the transistor, and an output end of the first switching transistor is a source of the transistor.

8. The display panel according to claim 5, wherein the plurality of scan lines comprise a second scan line coupled to the forward and reverse scan pull-down circuit, and the forward scan control module includes a second switching transistor;

a control terminal of the second switching transistor is connected to the second scan line, an output terminal of the second switching transistor is connected to the control terminal of the first switching transistor, and an input terminal of the second switching transistor is connected to the forward control signal.

9. The display panel according to claim 8, wherein the second switching transistor is a transistor.

10. The display panel according to claim 9, wherein a control end of the second switching transistor is a gate of the transistor, an input end of the second switching transistor is a drain of the transistor, and an output end of the second switching transistor is a source of the transistor.

11. The display panel according to claim 8, wherein the plurality of scan lines comprise a third scan line corresponding to the forward and reverse scan pull-down circuit, and the reverse scan control module includes a third switching transistor;

a control terminal of the third switching transistor is connected to the third scan line, an output terminal of the third switching transistor is connected to the control terminal of the first switching transistor, and an input terminal of the third switching transistor is fed with a reverse control signal.

12. The display panel according to claim 11, wherein the third switching transistor is a transistor.

13. The display panel according to claim 12, wherein a control end of the third switching transistor is a gate of the transistor, an input end of the third switching transistor is a drain of the transistor, and an output end of the third switching transistor is a source of the transistor.

14. The display panel according to claim 11, wherein the third scan line, the first scan line and the second scan line corresponding to the forward and reverse scan pull-down circuits are arranged adjacently.

15. The display panel according to claim 1, further comprising:

a low voltage level signal line, located on the display area and connected to an input terminal of the pull-down module.

16. The display panel according to claim 1, further comprising:

a plurality of pixel circuits, arranged in one-to-one correspondence with the plurality of forward and reverse scan pull-down circuits, wherein the output terminal of the pull-down module of the forward and reverse scan pull-down circuit is connected to a scan signal input terminal of the pixel circuit.

17. The display panel according to claim 1, further comprising:

a non-display area, located outside the display area; and a gate driving circuit, comprising a plurality of cascaded gate driving units and located on the non-display area;

wherein the plurality of gate driving units arranged in one-to-one correspondence with the plurality of forward and reverse scan pull-down circuits; a control terminal of a forward scan control module of the forward and reverse scan pull-down circuit is connected to a scan signal output terminal of a next stage gate driving unit that is a gate driving unit at next stage of the gate driving unit corresponding to the forward and reverse scan pull-down circuit; a control terminal of the reverse scan control module of the forward and reverse scan pull-down circuit is connected to a scan signal output terminal of a previous one stage gate driving unit that is a gate driving unit at previous one stage of the gate driving unit corresponding to the forward and reverse scan pull-down circuit.

18. The display panel according to claim 1, wherein the output terminal of the pull-down module connects the first scan line at a middle of the first scan line.

* * * * *